United States Patent [19]
Leech

[11] Patent Number: 5,904,183
[45] Date of Patent: May 18, 1999

[54] RECREATIONAL VEHICLE WASTE DRAINER

[76] Inventor: Alan R. Leech, 35536 Cypress Haven Way, Leesburg, Fla. 34788

[21] Appl. No.: 08/731,510

[22] Filed: Oct. 15, 1996

[51] Int. Cl.⁶ .................................................. F16L 57/00
[52] U.S. Cl. ......................... 138/110; 138/114; 138/120; 138/89; 137/355.16
[58] Field of Search .................................... 138/103, 106, 138/110, 114, 118, 120, 91, 89; 137/355.16; 16/115

[56] References Cited

U.S. PATENT DOCUMENTS

| | | |
|---|---|---|
| 3,712,331 | 1/1973 | Otto .................................. 137/355.16 |
| 3,730,228 | 5/1973 | Gibbs, Sr. . |
| 3,811,462 | 5/1974 | Feliz ................................. 137/355.16 |
| 4,133,347 | 1/1979 | Mercer . |
| 4,180,102 | 12/1979 | Larkin . |
| 4,223,702 | 9/1980 | Cook . |
| 4,231,595 | 11/1980 | Knutsen . |
| 4,712,755 | 12/1987 | Robbins et al. . |
| 4,844,121 | 7/1989 | Duke ................................. 137/355.16 |
| 4,854,349 | 8/1989 | Foreman . |
| 4,905,939 | 3/1990 | Horn . |
| 5,023,959 | 6/1991 | Mercer .............................. 137/355.16 |
| 5,417,460 | 5/1995 | Lunder . |

*Primary Examiner*—Denise L. Ferensic
*Assistant Examiner*—James F. Hook
*Attorney, Agent, or Firm*—Edward M. Livingston, Esq.

[57] ABSTRACT

A recreational vehicle (RV) waste drainer having a drainer sheath (1) with an angled drain nipple (3) at a receptacle end in fluid communication with an expandable tube (5) in the drainer sheath. A drain end of the expandable tube is attached to the drain nipple. A holding-tank connector (6) on a holding-tank end of the expandable tube connects the expandable tube to an RV holding tank (21, 22) for draining it and connects the expandable tube to a sheath lid (4) for sealing the drainer sheath and the expandable tube against escape of odorous gases and liquid at a tube end of the drainer sheath when not in use. The drain nipple has a beveled nipple-attachment wall (9) that is resilient and sized to fit inside of receptacle pipes (10) of RV sewage receptacles (11). A nipple lid (2) has a nipple sleeve that fits onto the beveled outside periphery of the drain nipple like an input pipe to seal the drainer sheath against escape of odorous gases and liquid at the drain nipple when not in use.

23 Claims, 2 Drawing Sheets

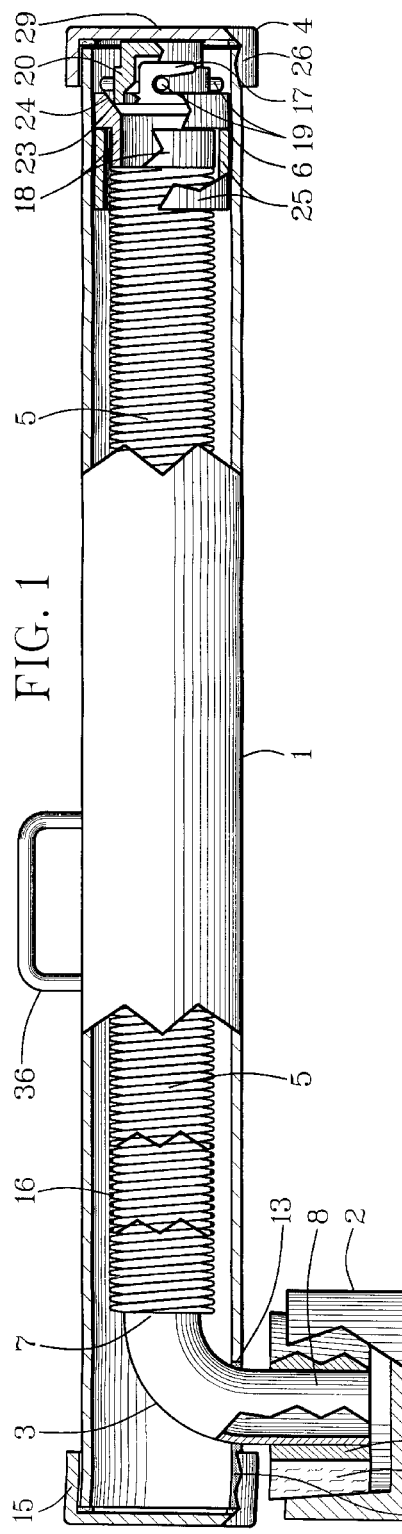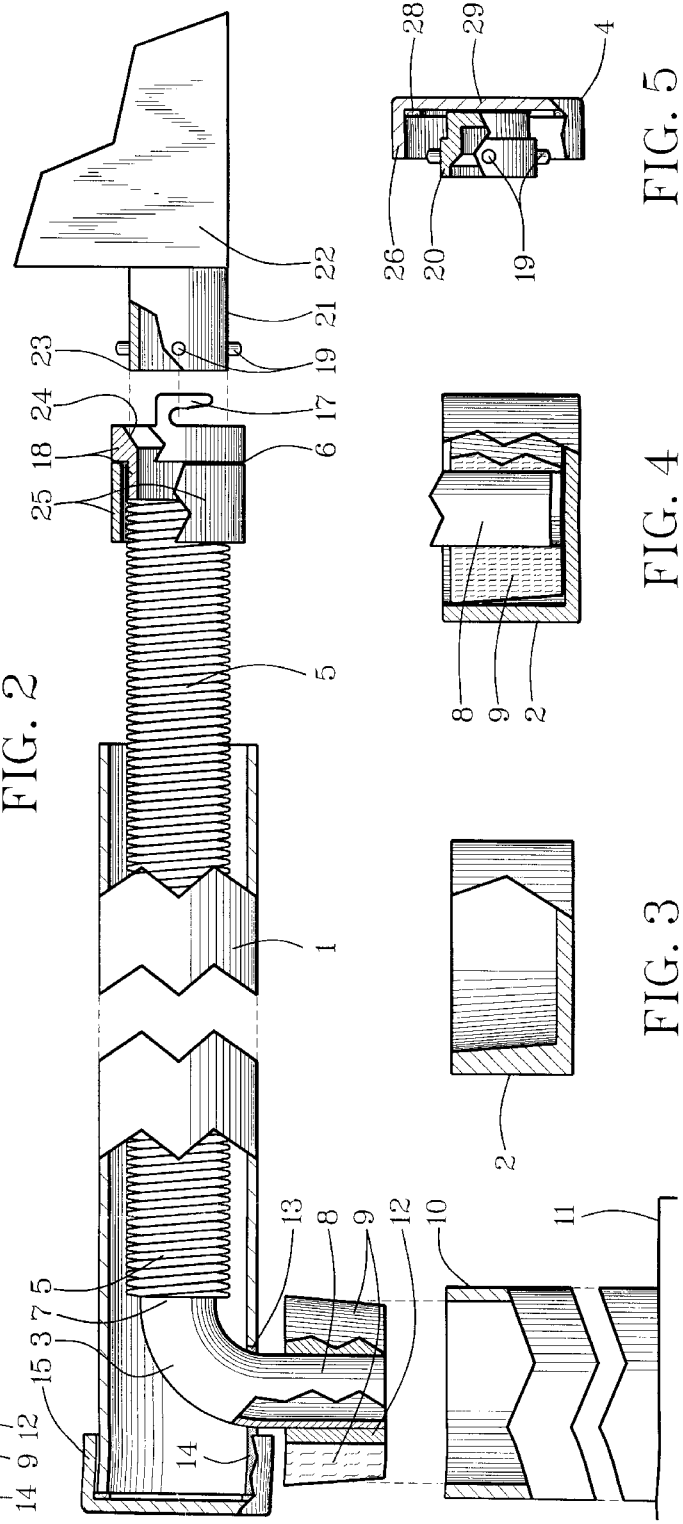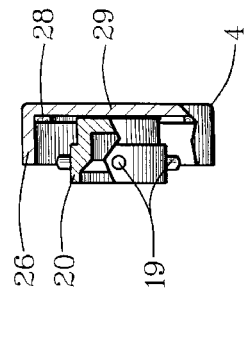
FIG. 1
FIG. 2
FIG. 3
FIG. 4
FIG. 5

RECREATIONAL VEHICLE WASTE DRAINER

BACKGROUND OF THE INVENTION

This invention relates to a drain tube for a recreational vehicle (RV) and in particular to a convolute drain tube carried in portable casing in which the drain tube is sealed when not in use and when being used has sealing attachment to RV sewage receptacles.

There is one unpleasant and at times gross aspect of an otherwise pleasurable way of life traveling and living in motor homes, campers and travel trailers which are known collectively as RV's. It is handling the sewage. Known drainer systems and devices involve messy, wet and horribly smelling contact with sewage-disposal items and conditions.

Examples of different but related RV sewage-handling devices are described in the following patent documents. U.S. Pat. No. 4,854,349, issued on Aug. 8, 1989 to Foreman, describes a sealable sleeve attached to a bottom of a recreational vehicle (RV) for holding an expandable sewage tube. U.S. Pat. No. 4,231,595, issued on Nov. 4, 1980 to Knutsen, describes a differently attached but similarly functional sleeve attached to a bottom of an RV for holding an expandable sewage tube. U.S. Pat. No. 4,223,702, issued on Sep. 23, 1980 to Cook, teaches a telescopically expandable sleeve for holding an expandable sewage tube intermediate an RV and a sewage receptacle. U.S. Pat. No. 4,180,102, issued on Dec. 25, 1979 to Larkin, taught a sleeve with half-circle sections held together with end rings for holding an expandable sewage tube. U.S. Pat. No. 4,133,347, issued on Jan. 9, 1979 to Mercer, described another sleeve attached to an RV bottom by attachment directly to a sewage-outlet pipe. Finally, U.S. Pat. No. 4,712,755, issued on Dec. 15, 1987 to Robbins, et al. teaches railing to hold an expandable sewage tube between an RV holding tank and a sewage receptacle.

Industry literature describes other devices but none having the features of this invention. The nearest known is a hose-carrier tube that can be mounted onto an RV.

SUMMARY OF THE INVENTION

In light of need for improvement of sewage handling for recreational vehicles, objects of this invention are to provide an RV waste drainer which:

Is hand-portable in a sealed mode with a contracted sewage tube inside to prevent escape of objectionable odor and liquid when not in use, when being carried in an RV or when being stored wherever desired;

Can be connected to a sewage receptacle easily and conveniently without contact with wet or soiled components;

Seals easily and effectively to any size and type of conventional sewage-receptacle inlet;

Allows clean, easy and convenient attachment of an expandable sewage tube to an outlet of a holding tank;

Eliminates need for a special carrying compartment for a sewage hose;

Can be marketed as a separate drainer unit for any type and size of RV; and

Can be inexpensive to produce and long lasting.

This invention accomplishes these and other objectives with an RV-waste drainer having a drainer sheath with an angled drain nipple at a receptacle end. An expandable sewage tube inside of the drainer sheath has a drain end attached to the drain nipple. A holding-tank connector on a holding-tank end of the expandable tube connects the expandable tube to an RV holding tank for draining it and connects the expandable tube to a sheath lid for sealing the drainer sheath and the expandable tube against escape of odorous gases and liquid at a tube end of the drainer sheath when not in use. The drain nipple has a beveled outside periphery that is resilient and sized to fit inside of input pipes to RV sewage receptacles. With the drain nipple resiliently sealed to an inside periphery of an input pipe, the holding-tank connector is disconnected from the sheath lid and attached to an RV holding tank with the holding-tank connector. A nipple lid has a nipple sleeve that fits onto the beveled outside periphery of the drain nipple like an input pipe to seal the drainer sheath against escape of odorous gases and liquid at the drain nipple.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 1 is a partially cutaway plan view of the RV-waste drainer in a storage mode;

FIG. 2 is a partially cutaway and partially cut-short plan view of the RV-waste drainer in relation to an RV holding tank and an RV sewage receptacle for a drainage mode;

FIG. 3 is a cutaway elevation view of a nipple lid having bevelled inside walls;

FIG. 4 is a cutaway elevation view of a nipple lid having parallel inside walls in relationship to a drain nipple;

FIG. 5 is a cutaway side view of a sheath lid;

DESCRIPTION OF PREFERRED EMBODIMENT

Figure 6:
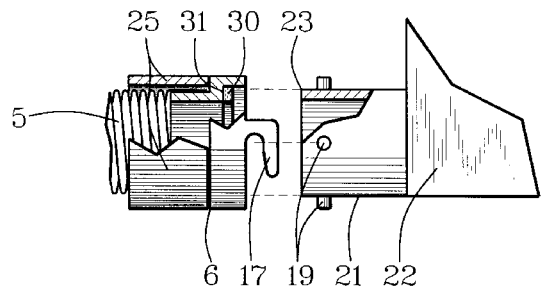
FIG. 6 is a sectional cutaway side view of a holding-tank connector having an optional seal ring in working relationship to a holding-tank outlet pipe.
Figure 7:
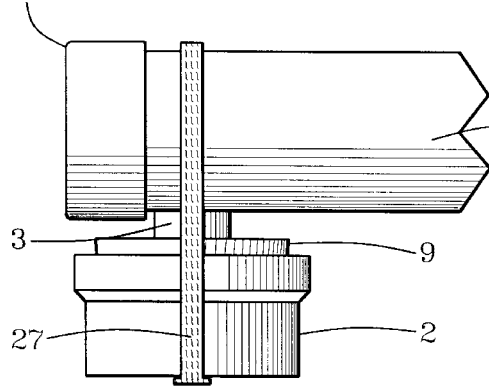
FIG. 7 is a sectional end view of a receptacle end of a drainer sheath having a resilient strap as a nipple-lid retainer.

Reference is made first to FIG. 1 in the drawings. A drainer sheath 1 has a nipple lid 2 on a drain nipple 3 at a receptacle end and a sheath lid 4 on a sheath-tube end for a storage mode of the RV-waste drainer depicted in FIG. 1. An expandable tube 5 with a design length contracted inside of the drainer sheath 1 has a holding-tank end attached to a holding-tank connector 6 and a drain end sealed peripherally to an inlet end 7 of the drain nipple 3. The drain nipple 3 has a nipple-outlet end 8 that is angled designedly, preferably ninety degrees, from the sheath axis. For the storage mode of the RV-waste drainer, a nipple-attachment wall 9 on the nipple-outlet end 8 is bevelled, resilient and sized to bevel-fit snugly inside of the nipple lid 2.

Referring to FIG. 2, the nipple-attachment wall 9 is sized and shaped also to seal-fit snugly into a design size range of receptacle pipes 10 of sewage receptacles 11 for a drainage mode of the RV-waste drainer. The nipple-attachment wall 9 can be attached directly to the nipple-outlet end 8 as depicted in FIG. 4 or can be attached with a nipple-attachment sleeve 12 as shown in FIGS. 1–2. The nipple lid 2 can have inside peripheral walls that are bevelled in design proportion to walls of the nipple-attachment wall 9 as shown in FIGS. 1 and 3 or can have inside peripheral walls that are parallel as shown in FIG. 4.

A selection of means can be employed for attachment of the drain nipple 3 to the drainer sheath 1 and to the drain end of the expandable tube 5. Depicted in FIGS. 1–2 are nipple bays 13 into which the drain nipple 3 is inserted and then affixed with an adhesive 14 to the drainer sheath 1. A drain-end cap 15 then can be positioned on the receptacle end of the drainer sheath 1. The drain end of the expandable tube 5 can have an inside periphery or an outside periphery sealed to the nipple-inlet end 7 of the drain nipple 3, depending on the type and size of drain nipple 3, expandable tube 5 and drainer sheath 1 employed. The expandable tube 5 can have an inside periphery sealed to an outside periphery of the nipple-inlet end 7 and an outside periphery of the expandable tube 5 sealed to an inside periphery of an internal extension of the receptacle end of the drainer sheath 1 as a design option.

The expandable tube 5 can be a convolute type having internally convoluted wires 16, depicted in a cutaway in FIG. 1 or optionally an accordion type preferred by some users for a smoother interior, a telescopic type or foreseeably a stretch type without expansion crevices.

Referring to FIGS. 1–2 and 5, a variety of holding-tank connectors 6 are foreseeable. One holding-tank connector 6 has a pair of hook threads 17 that are oppositely positioned on a connection end of a connector sleeve 18 that is sealed to an inside periphery of a holding-tank end of the expandable tube 5. Boss threads 19 are extended radially from a tube-attachment sleeve 20 on the sheath lid 4 and similarly from a holding-tank outlet pipe 21 on an RV holding tank 22. For sealing the sheath lid 4 onto the holding-tank connector 6 for storage mode, boss threads 19 are first positioned in the hook threads 17. The holding-tank end of the expandable tube 5 is rotated in a rotational direction that forces the boss threads 19 into bays of the hook threads 17 and draws a circumferential seal ridge 23 on the tube-attachment sleeve 20 into sealing contact with an inwardly bevelled seal wall 24 on a tube end of the tube-attachment sleeve 20.

Sealing the holding-tank connector 6 onto the holding-tank outlet pipe 21 of an RV holding tank 22 for drainage mode is the same as with the sheath lid 4 for storage mode, except that the boss threads 19 are on the holding-tank outlet pipe 21 instead of on the tube-attachment sleeve 20 of the sheath lid 4. This is an edge-to-surface type of seal that is particularly effective for contaminating conditions such as occur in waste drainage.

Hand-holding the holding-tank end of the expandable tube 5 for rotating the hook threads 17 onto the boss threads 19 requires rigid grasping that can wear out and tear the expandable tube 5. An unprotected expandable tube 5 also is smelly, often wet, repulsive and unsanitary. It is difficult to keep clean and to remove its odor and contaminants from hands and clothing. A tube handle 25 positioned externally to the expandable tube 5 proximate the connector sleeve 18, therefore, is highly advantageous.

A preferred tube handle 25 is an impervious sleeve-like member that is either positioned on the expandable tube 5 where supported by the connector sleeve 18 internally or extended from the holding-tank connector 6. Due to rigidity of the connector sleeve 18 inside of an end of the expandable tube 5, it is not essential that the tube handle 25 be rigid, particularly if the connector sleeve 18 is long enough inside for rigid support of a flexible, resilient or wraparound tube handle 25 having handgrip length on the outside of the expandable tube 5. A tube handle 25 that is either rigid, flexible, or pliable can be also a connector or holder of the expandable tube 5 onto an appropriately structured connector sleeve 18.

Figure 8:
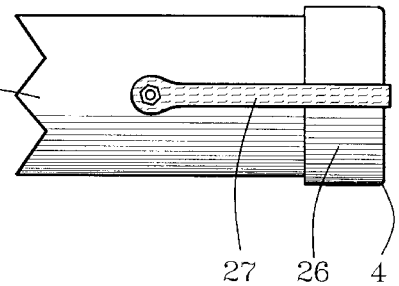
FIG. 8 is a sectional end view of a sheath-tube end of a drainer sheath having a resilient strap as a sheath-lid retainer.

Referring to FIGS. 1, 5 and 8, the sheath lid 4 has a sheath-attachment sleeve 26 with an inside periphery that fits onto an outside periphery of the sheath-tube end of the drainer sheath 1. It can be fit tightly, screwed on with threads or forced on with a resilient strap 27 as a sheath-lid retainer. A sheath-lid seal ring 28 can be positioned for linear sealing between a lid plate 29 and the sheath-tube end of the drainer sheath 1. The tube-attachment sleeve 20 is attached to and extended from the lid plate 29.

Referring to FIGS. 1–4 and 7, a resilient strap 27 also can be used as a nipple-lid retainer. Also foreseeable are threads, hooks and non-resilient straps for lid retainers.

Referring to FIGS. 1–2 and 5–6, a tube-seal ring 30 can be positioned intermediate a tube end of the tube-attachment sleeve 20 or a holding-tank outlet pipe 21 and a circumferential seal wall 31 proximate the holding-tank end of the holding-tank connector 6. The tube end of the tube-attachment sleeve 20 or the holding-tank outlet pipe 21 and the circumferential seal wall 31 are forced against opposite sides of the tube-seal ring 30 by the holding-tank connector 6. The circumferential seal wall 31 has an inside diameter and an outside diameter that are designedly equal to an inside diameter and an outside diameter of the tube-attachment sleeve 20 and that are designedly equal to an inside diameter and an outside diameter of a holding-tank outlet pipe 21, such that sealed connection of the expandable tube 5 to the sheath lid 4 is designedly similar to sealed connection of the expandable tube 5 to the holding-tank outlet pipe 21 for respectively storage mode and drainage mode of the RV-waste drainer.

This is a surface-to-surface seal that is optional to the edge-to-surface seal described in relation to FIGS. 1–2 and 5. It can be used also in combination with the edge-to-surface seal by tapering the tube-seal ring 30 and positioning it on the inwardly bevelled seal wall 24.

Figure 9:
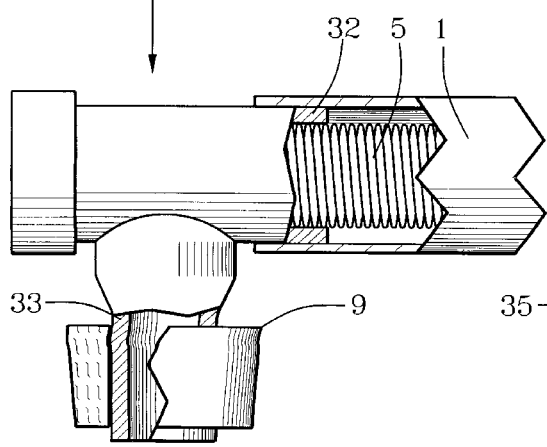
FIG. 9 is a partially cutaway sectional view of a receptacle end of a drainer sheath having an optional T-joint drain nipple.

Referring to FIG. 9, the drain nipple 3 can be a T-joint having a first-end portion 32 attached to the drainer sheath 1 and sealed to the expandable tube 5. A second-end portion 33 is extended at a design angle from the receptacle end of the drainer sheath 1 and designedly bevelled resilient tubing such as a nipple-attachment wall 9 is affixed peripherally to the second-end portion 33 for a T-joint drain nipple 3.

Figure 10:
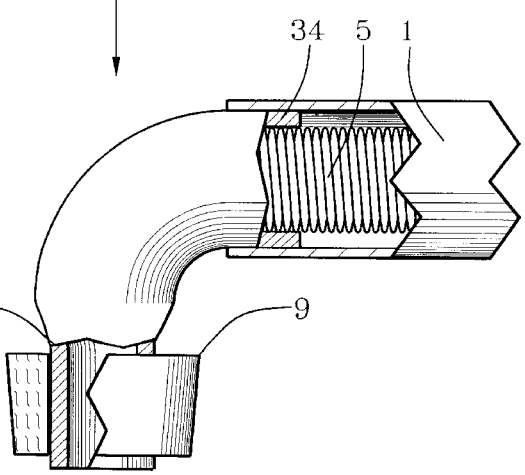
FIG. 10 is a partially cutaway sectional view of a receptacle end of a drainer sheath having an optional elbow-joint drain nipple.

Referring to FIG. 10, the drain nipple 3 can be an elbow joint having a first-end portion 34 attached to the drainer sheath 1 and sealed to the expandable tube 5. A second-end portion 35 is extended at a design angle from the receptacle end of the drainer sheath 1 and designedly bevelled resilient tubing such as a nipple-attachment wall 9 is affixed peripherally to the second-end portion 35 for an elbow-joint drain nipple 3.

The T-joint drain nipple 3 of FIG. 9 and the elbow-joint drain nipple 3 of FIG. 10 are representative of options that are foreseeable for attaching the drain nipple 3 to the receptacle end of the drainer sheath 1 with the nipple-outlet end 8 angled designedly from the sheath axis. Select sizes of select ends of the drain nipple 3 can be matched with select sizes of drainer sheaths 1 and expandable tubes 5 in accordance with design preferences for different use conditions and for different sizes of receptacle pipes 10.

Referring further to FIG. 1, a drainer handle 36 is positioned on a side of the drainer sheath 1 that is opposite from angled extension of the drain nipple 3 and designedly weight-centered between the sheath-tube end and the receptacle end of the RV-waste drainer for ease of transport, storage and use.

A new and useful RV-waste drainer having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An RV-waste drainer comprising:
   a drainer sheath having a sheath-tube end, a receptacle end, a sheath inside periphery, a sheath outside periphery and a sheath axis;
   a drain nipple attached to the receptacle end of the drainer sheath;
   the drain nipple having a nipple-outlet end that is angled designedly from the sheath axis;
   a nipple-attachment wall that is beveled, resilient and sized to bevel-seal fit snugly against an inside periphery of a design size range of receptacle pipes of sewage receptacles for a drainage mode of the RV-waste drainer;
   a design length of expandable tube inside of the drainer sheath;
   the expandable tube having a holding-tank end and a drain end;
   a holding-tank connector on the holding-tank end of the expandable tube;
   the drain end of the expandable tube being sealed peripherally to an inlet end of the drain nipple;
   the expandable tube being expandable selectively from the sheathe-tube end of the drainer sheath and positioned with the holding-tank end of the expandable tube being sealed detachably to a holding-tank outlet with the holding-tank connector for a drainage mode of the RV-waste drainer;
   a sheath lid that is attached detachably in sealing connection to the sheath-tube end of the drainer sheath and that is attached detachably to the holding-tank end of the expandable tube with the holding-tank connector being a detachable attachment of the sheath lid to the expandable tube for a storage mode of the RV-waste drainer; and
   a nipple lid with a lid sleeve extended from an inside surface of the nipple lid and the lid sleeve having an inside periphery that is sized to seal against the nipple-attachment wall for a storage mode of the RV-waste drainer, such that opposite ends of the drainer sheath can be sealed with the expandable tube contained in the drainer sheath for storage mode and such that the drain nipple can be sealed in a receptacle pipe and the expandable tube can be extended from the drainer sheath and attached to the holding-tank outlet for drainage mode of the RV-waste drainer, respectively, as selected.

2. An RV-waste drainer as described in claim 1 wherein:
   the drainer sheath is a pipe made of a designedly light-weight, strong and impervious material having an interior diameter sized to receive either of a design size range of expandable tubes and having a length to receive a design length of select expandable tube in a contracted mode.

3. An RV-waste drainer as described in claim 2 wherein:
   the drain nipple is a pipe elbow made of a designedly light-weight, strong and impervious material;
   the drain end of the expandable tube is sealed to a first end of the pipe elbow;
   the pipe elbow is affixed to a side of the receptacle end of the drainer sheath; and
   a second end of the pipe elbow is extended at a design angle from the drainer sheath.

4. An RV-waste drainer as described in claim 3 wherein:
   the nipple-attachment wall that is bevelled is a rubberlike material having an inside periphery that is affixed to an outside periphery of the outside end of the pipe elbow.

5. An RV-waste drainer as described in claim 4 wherein:
   the inside periphery of the lid sleeve has a diameter that is equal to a design section of outside periphery of the nipple-attachment wall that is bevelled.

6. An RV-waste drainer as described in claim 4 wherein:
   the inside periphery of the lid sleeve is bevelled in design proportion to a bevel angle of the nipple-attachment wall that is bevelled.

7. An RV-waste drainer as described in claim 4 and further comprising:
   a nipple-lid retainer.

8. An RV-waste drainer as described in claim 7 wherein:
   the nipple-lid retainer is a resilient strap having contraction force intermediate the nipple lid and the drainer sheath.

9. An RV-waste drainer as described in claim 1 and further comprising:
   a drainer handle on a side of the drainer sheath that is opposite from angled extension of the drain nipple and designedly weight-centered between the sheath-tube and the receptacle end of the RV-waste drainer.

10. An RV-waste drainer as described in claim 1 wherein:
    the drain nipple is an elbow joint made of a designedly light-weight and strong material;
    a first-end portion of the elbow joint is attached to the drainer sheath and sealed to the expandable tube;
    a second-end portion of the elbow joint is extended at a design angle from the receptacle end of the drainer sheath; and
    designedly bevelled resilient tubing is affixed peripherally to the second-end portion of the elbow joint.

11. An RV-waste drainer as described in claim 1 wherein:
    the drain nipple is a T-joint made of a designedly light-weight and strong material;
    a first-end portion of the T-joint is attached to the drainer sheath and sealed to the expandable tube;
    a second-end portion of the T-joint is extended at a design angle from the receptacle end of the drainer sheath; and
    designedly bevelled resilient tubing is affixed peripherally to the second-end portion of the T-joint.

12. An RV-waste drainer as described in claim 1 wherein:

the sheath lid has a sheath-attachment sleeve extended from an inside surface of a lid plate; and the sheath-attachment sleeve has an inside periphery that is sized and shaped to fit snugly onto an outside periphery of the sheath-tube end of the drainer sheath for sealing against escape of odorous gases and liquids from the expandable tube.

13. An RV-waste drainer as described in claim 1 wherein:

the sheath lid has a sheath-attachment sleeve extended from an inside surface of a lid plate; and the lid plate has a resilient inside surface against which the sheath-tube end of the drainer sheath is pressured in sealing contact by the holding-tank connector to prevent escape of odorous gases and liquids from inside of the expandable tube.

14. An RV-waste drainer as described in claim 1 wherein:

the sheath lid has a tube-attachment sleeve extended from an inside surface of a lid plate;

the holding-tank connector has an inwardly beveled seal wall at a connection end;

a tube end of the tube-attachment sleeve has a circumferential seal ridge with a circumferential edge;

the circumferential edge of the circumferential seal ridge is forced against the inwardly beveled seal wall at the connection end of the holding-tank connector by bevel action of the holding-tank connector for sealing the sheath lid to the expandable tube for storage mode of the RV-waste drainer.

15. An RV-waste drainer as described in claim 14 wherein:

the circumferential seal ridge on the tube end of the tube-attachment sleeve on the sheath lid has an inside diameter and an outside diameter that are designedly equal to an inside diameter and an outside diameter of an RV holding-tank outlet pipe, such that sealed connection of the expandable tube to the sheath lid is designedly similar to sealed connection of the expandable tube to the RV holding-tank outlet pipe for respectively storage mode and drainage mode of the RV-waste drainer.

16. An RV-waste drainer as described in claim 15 wherein:

the holding-tank end of the expandable tube has a tube handle to which the holding-tank end of the expandable tube and the holding-tank connector are affixed rigidly;

the tube handle being sized and shaped for convenient handling of the expandable tube and the holding-tank connector without damage to and without hand-contact with the expandable tube and contaminated parts of the holding-tank connector when the expandable tube is being extended from inside of the drainer sheath to a holding-tank outlet for drainage mode of the RV-waste drainer and when the holding-tank connector is being connected to and disconnected from the holding-tank outlet.

17. An RV-waste drainer as described in claim 16 wherein:

the tube handle is a sleeve member positioned proximate the holding-tank connector and being circumferentially external to an outside periphery of a select portion of the holding-tank end of the expandable tube.

18. An RV-waste drainer as described in claim 1 wherein:

the sheath lid has a tube-attachment sleeve extended from an inside surface of a lid plate;

a tube-seal ring is positioned intermediate a tube end of the tube-attachment sleeve and a circumferential seal wall proximate the holding-tank end of the holding-tank connector; and the tube end of the tube-attachment sleeve and the circumferential seal wall are forced against opposite sides of the tube-seal ring by the holding-tank connector for sealing the sheath lid to the expandable tube for storage mode of the RV-waste drainer.

19. An RV-waste drainer as described in claim 18 wherein:

the circumferential seal wall has an inside diameter and an outside diameter that are designedly equal to an inside diameter and an outside diameter of the tube-attachment sleeve and that are designedly equal to an inside diameter and an outside diameter of a holding-tank outlet pipe, such that sealed connection of the expandable tube to the sheath lid is designedly similar to sealed connection of the expandable tube to the holding-tank outlet pipe for respectively storage mode and drainage mode of the RV-waste drainer.

20. An RV-waste drainer as described in claim 1 wherein:

the holding-tank end of the expandable tube has a tube handle to which the holding-tank end of the expandable tube and the holding-tank connector are affixed rigidly;

the tube handle being sized and shaped for convenient handling of the expandable tube and the holding-tank connector without damage to or hand-contact with the expandable tube or contaminated parts of the holding-tank connector when the expandable tube is being extended from inside of the drainer sheath to a holding-tank outlet for drainage mode of the RV-waste drainer and when the holding-tank connector is being connected to and disconnected from the holding-tank outlet.

21. An RV-waste drainer as described in claim 20 wherein:

the tube handle is a sleeve member positioned proximate a holding-tank connector and being circumferentially external to an outside periphery of a select portion of the holding-tank end of the expandable tube.

22. An RV-waste drainer as described in claim 1 and further comprising:

a sheath-lid retainer.

23. An RV-waste drainer as described in claim 22 wherein:

the sheath-lid retainer is a resilient strap having contraction force intermediate the sheath lid and the drainer sheath.

* * * * *